United States Patent [19]

Catan

[11] Patent Number: 5,333,783
[45] Date of Patent: Aug. 2, 1994

[54] AUTOMATED AIR MIXING SYSTEM

[76] Inventor: Robert S. Catan, 10 Westbrook Ct., Greenlawn, N.Y. 11740

[21] Appl. No.: 20,364

[22] Filed: Feb. 22, 1993

[51] Int. Cl.$^5$ ............................................ G05D 23/00
[52] U.S. Cl. ................................... 236/13; 165/16; 454/239
[58] Field of Search ................... 236/13, 49.3; 165/16; 364/502; 137/3; 454/239

[56] References Cited

U.S. PATENT DOCUMENTS

| | | | |
|---|---|---|---|
| 3,979,922 | 9/1976 | Shavit | 165/16 X |
| 4,969,598 | 11/1990 | Garris | 137/3 |
| 5,033,360 | 7/1991 | Sacks | 454/239 |

*Primary Examiner*—William E. Wayner
*Attorney, Agent, or Firm*—Ladas & Parry

[57] ABSTRACT

An air handling system is provided which includes sections for the introduction of outside or ambient air relative to a structure to be mixed with a flow of inside or return air in a flow path in which the resulting mixture is impelled by a fan to be discharged through a plurality of radially disposed vents. The temperatures of the ambient and inside air as well as of the discharge air is converted into signals which are fed into a microprocessor which in turn generates signals to control dampers which in turn controls the rates of flow of inside and outside air into the principal flow path which is controlled by the aforementioned fan which generates a constant rate of flow through the discharge air vents. The temperature of the discharge air is used to control the ratio of the flows of ambient and inside air which collectively constitute the discharge air.

11 Claims, 5 Drawing Sheets

AUTOMATED AIR MIXING SYSTEM

FIELD OF INVENTION

This invention relates to automated air mixing systems and more particularly to automated control devices for proportional volume control of air flow.

BACKGROUND

Air systems are known for the handling of air. In most air handling systems that involve comfort or environmental air handling a certain amount of outside or ambient air is mixed with recirculated inside air to produce an air quality desired for the associated facility. The requirement for such a system may be motivated by code requirements regarding occupancy levels, by varying the amount of outside air to compensate for the number of for example gas fork lift trucks operating in an enclosure, or to reduce the content of undesirable air contaminants. Such systems are normally equipped with modulating or single acting dampers the purpose of which is to provide a proper mix of outside air to return air. In such systems the outside damper is controlled along with an inside air damper to cause a mixed air result. Such an arrangement is common practice and is known to most practitioners.

The precise control of such a mixing, whether in accordance with a thermostat control for discharge air temperature or by any other sensor, is dependent on the precision of the dampers and the repeatability of an activating device and damper combination. Technical publications are available which are filled with technical advice on the proper method of designing dampers which begin to approach a linear action that will, for example, bring in 50% of outside or ambient air when an actuator moves by a magnitude of 50%. This leaves the control technology with the dilemma of creating a complex and costly control system subject to high maintenance costs to provide through non-linear dampers a specific amount of ambient air.

In the field with which the present invention is concerned, controlled make-up air systems, one has to match precisely the output of exhaust fans. The ability to signal the damper system and have it deliver a precise amount of air through the associated mixing dampers is extremely difficult with existing technology and particularly with the operational cycle of the dampers.

SUMMARY OF INVENTION

Due to the necessity of having available a system that can receive instructions relative to the amount of exhaust equipment that is operating or receiving information on air quality which it interprets to determine the amount of air required to establish proper air quality, apparatus is required that can receive input data and set the associated dampers to provide the required amount of outside or ambient air.

An object of the invention is to provide the system indicated above in a cost efficient apparatus that does not require the precision of an expensive damper system but provides repeatability and is self correcting with respect to the degeneration of air flow that may occur in any system which uses filters, belts and bearings or the like.

To achieve the above and other of the objects of the invention, there is provided an apparatus for a construction having inside and ambient air including a system comprising a first air guide component defining a principle air flow path, a second air guiding component for admitting the ambient air into the principle air flow path, and a first control component for controlling the rate of flow of the ambient air into the principle flow path. In addition thereto, a component is provided for admitting the inside air into the principle flow path and a second control component for controlling the rate of flow of the inside air into the principle air flow path. A discharge component is furthermore provided for enabling the discharge of air from the principle flow path into the interior of the construction at a predetermined rate. Two sensing components are furthermore provided to measure the temperatures of the inside and ambient air and a microprocessor responsive to the sensing components generates signals which correspond to a computation or determination of the temperature that a third sensing component should help to maintain. If the third component does not register the determined temperature, the microprocessor generates signals to control the first and second control components to adjust the rates of flow of the inside and outside air to maintain the air discharge into the interior of the construction at the pre-determined temperature. Stated otherwise, the temperatures of inside and outside air flows are measured and used, along with the amount of exhausted air to calculate a temperature that represents the proper proportions for the combined flow, this desired temperature controling the ratio of inside and outside air by positioning dampers. Thereby a flow of air is produced in which outside air makes up for the exhausted air and temperature is used to control the combined inside and outside air flow.

The control components may include dampers and motors to control the same, these motors being coupled to and responsive to the microprocessor to be controlled by the signals generated thereby. The discharge component may include a fan or blower for operating with a constant throughput. Moreover, the principle flow path is preferably substantially vertical with the discharge component including at least one discharge vent which discharges air in a horizontal direction. Preferably the discharge component may include a plurality of discharge vents discharging air in a multiple of horizontal directions which are radially disposed relative to the principle flow path.

Further to the above, the construction may include a roof with the aforesaid apparatus further including components supporting the first and second air guiding components being located on said roof. As will be shown hereinafter, the second air guiding component provides for the flow of ambient air through the roof into the principle flow path.

As will further be shown hereinafter, the microprocessor operates to control the aforesaid motors in unison such that the motors operate in opposite manner to open and close the dampers respectively. Moreover, the microprocessor is adapted to secure a pre-determined temperature and control the motors to adjust the dampers until the pre-determined temperature is secured as indicated.

In further accordance with the invention there is provided a method for controlling the flow of air in a structure having inside and ambient air sources. This method comprises for example the steps of mixing controlled flows of the inside and ambient air flows to obtain a mixture thereof and controlling the rates of flow of the inside and ambient air flows in accordance with the respective temperatures of the inside and ambient air. In further accordance with the invention the mixture is discharged within the structure at a constant rate of flow.

The above and other objects, features and advantages of the invention will be found in the detailed description which follows hereinbelow as illustrated in the accompanying drawing.

DETAILED DESCRIPTION

Figure 1:
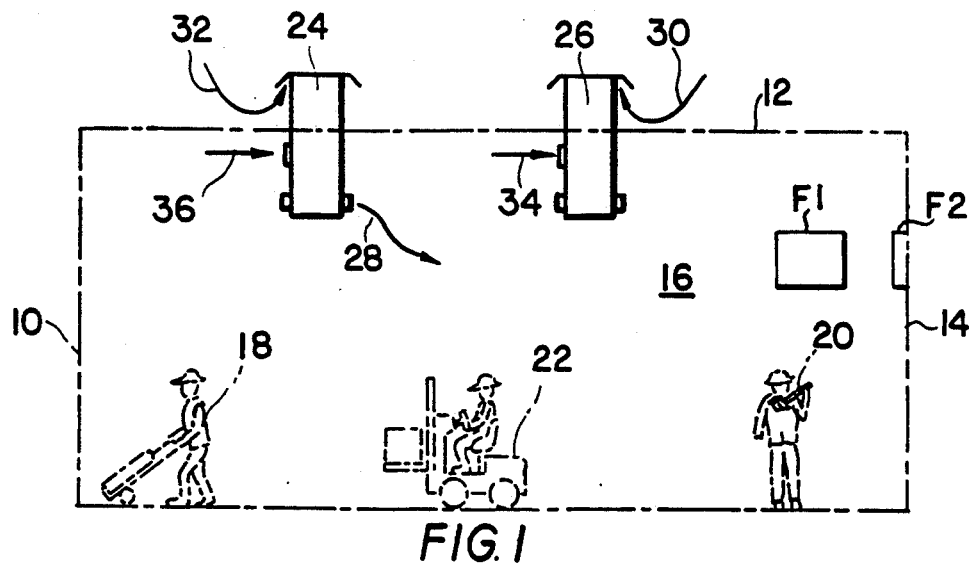
FIG. 1 is a diagrammatic view of a construction or structure provided with air handling systems in accordance with the invention.

FIG. 1 illustrates a construction or structure 10 having a roof 12 and the side walls 14 as well as an interior 16. In the enclosure may be, for example, workers or operators 18 and 20 and a fork lift truck 22. Installed in the roof 12 of the structure 10 are a plurality of, for example, systems 24 and 26 which are systems provided in accordance with the invention to assure a constant rate of flow of discharge air into the interior 16. This discharge of air is indicated at 28 and consists of a mixture of outside air which enters into the enclosure as indicated at 30 and 32, with the flow of inside or return air being indicated at 34 and 36 for the respective systems.

Figure 2:
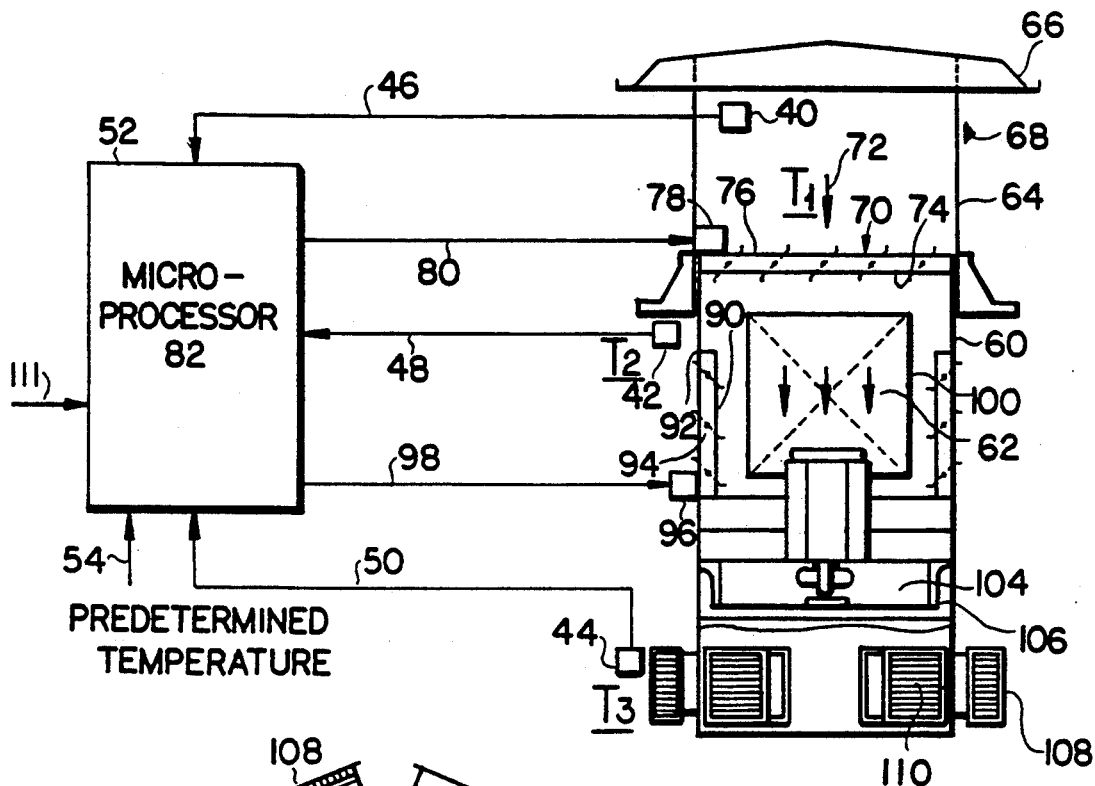
FIG. 2 is a diagrammatic partially broken away view of a system provided in accordance with the invention.
Figure 3:
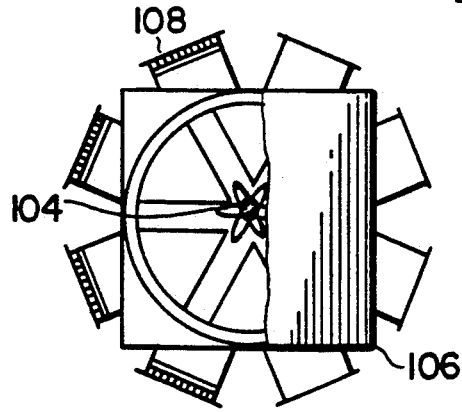
FIG. 3 is a top diagrammatical view, partially broken away, of the system of FIG. 2.

The construction of systems 24 and 26 is diagrammatically illustrated in FIGS. 2 and 3. Therein are indicated temperature sensors 40, 42 and 44 respectively measuring the temperature of the outside air, the inside or return air, and the discharged air, these temperatures being respectively indicated as T1, T2 and T3. These sensors generate respective signals which are transmitted via lines 46, 48 and 50 to a microprocessor 82. A further input to the microprocessor 82 may be a predetermined temperature signal or setting indicated by way of example at 54.

Each system may consist of a casing 60 confining a flow path indicated for example by arrows 62. This flow path may be referred to as the principle flow path. Atop the casing 62 is a further casing or stack 64 provided with a hood 66 admitting the flow of outside air as indicated at 68. The stack 64 has associated therewith a damper 70 which controls the flow of outside or ambient air via a flow path 72 which leads to the principle flow path 62 referred to hereinabove. The damper 70 has a plurality of louvres indicated at 74. The position of these louvres on their respective pivots supported on a beam 76 is controlled by a motor 78 whose rotation in one direction or the other is controlled by signals received from the microprocessor 82 along line 80.

Interior air which is the inside or return air referred to hereinabove is admitted into the principle flow path via damper 90 including louvres 92 pivoted on pivots 94. The respective positions of the louvres 94 are controlled by a motor 96 controlled by signals received from the microprocessor 82 via line 98. An access door providing access to the flow path 62 is indicated at 100.

The discharge of air is controlled as to its rate of flow by a fan generally indicated at 104 positioned within the lower casing portion 106. The fan 104 operates to provide a constant rate of flow according to the standard rating of the system. This rate of flow for example may be 20, 30, 40 or 50 thousand cubic feet per minute since such systems may be provided as standard units having generally a constant rate of flow although fine tuning thereof will be understood to be included within such definition.

At the bottom of casing portion 106 is a plurality of radially disposed discharge vents 108. These discharge vents protrude from the casing portion 106 in radial directions relative to the principal flow path 62. They are provided with grills 110 and are preferably disposed to discharge the mixture resulting in the flow path 62 and impelled by the fan 104 in a direction which is preferably at least substantially horizontal at the outset. The discharge takes place in a plurality of radial horizontal directions as guided by the respective vents.

The microprocessor receives its signal from sensors. The microprocessor can receive two types of such signals. An on-off signal, representing the amount of air being exhausted can be received at line 111 from a multitude of individual exhaust fans (e.g. fans F1 and F2, FIG. 1). Each of these fans is calibrated for a rated capacity through a potentiometer built into the microprocessor. Since these fans can be selectively turned on and off, they constitute apparatus for controllably exhausting variable amounts of air from interior 16. This is how the microprocessor can calculate the required outside air and therefore the mixed air temperature. There is another type of input into the microprocessor. There are, for example, two analog inputs. They can receive signals from a series of exhaust fans, as differentiated from a single exhaust fan, to take into account a multitude of fans where each fan is provided with an individual resistor value proportional to the related amount of exhaust. The analog input may get a signal representing, say, 10,000 ohms. By way of example, there are ten exhaust fans of 1000 cfm each, and each fan goes on or off depending on the need. The analog port may get a signal saying all ten fans are on, or 10,000 ohms. The micro potentiometer for this analog is calibrated for 10,000 cfm, with a 100% input at 10,000 ohms, and 0% input at 0 ohms. In this way it is possible to adjust airflow as the various fans go on or off.

Another use for the analog port is for sensing devices that measure air purity. They will send a 0 to 10 volt, or 4 to 20 ma signal to the analog port. The system is calibrated by deciding that a 0 volt signal is minimum fresh air. A 2.5 v signal is 25% and so on. The fan control switches are then adjusted to turn on exhaust fans at each point (25%, 50%, etc.). The exhaust fans in turn are hooked up to the sail switches, which are calibrated with individual potentiometers and the circuit is thus complete. An increase in contaminants triggers a turning on of exhaust fans by the microprocessor. The exhaust fans are looped back into the system advising the microprocessor of the total amount of exhaust turned on, which in turn activates the damper control system to provide the necessary fresh air.

Viewed in another sense, the microprocessor may receive a signal from a host microprocessor (not shown) or other source in for example a 4 to 20 milliampere range. The lower magnitude represents 0% outside air whereas the maximum signal represents 100% of outside air. Thus, for example, a signal with a magnitude of 12 milliamps would represent 50% outside air with other magnitudes proportionally representing other percentages. Since the microprocessor 82 is provided with information as to the standard rate of flow of the associated system (for example 30,000 cubic per minute) a 50% signal would indicate that 15,000 cubic feet per minute of outside air should be delivered.

The microprocessor 82 is instructed as to two temperatures, including temperature T1 of the outside or ambient air, and temperature T2 of the return or inside air and T3, the desired temperature of the discharged air is calculated or determined. The calculation to determine the necessary discharge temperature at for example a 50% rate or any other percentage is straight-forward and is illustrated by the following example and solution:

EXAMPLE PROBLEM

What T3 temperature is required to require 50% outside air, when T1 is 20° F. and T2 is 60° F.

50% of 30,000 = 15,000 cfm $$T3 = \frac{T1 \times 15000 + T2 \times 15,000}{\text{Total cfm } 30,000}$$

$$T3 = 40° F.$$

According to the above, T3 which is the desired temperature of the discharge air is to be 40 degrees Fahrenheit. A measurement of T3 is provided by the sensor 44. This sensor signals the dampers via the microprocessor 82 to modulate until the T3 temperature is secured. The amount of change required is actually irrelevant to the system as, for example, it makes no difference whether the change is of a 2% or 80% magnitude.

In the foregoing system, heating of the air maybe provided as this makes no difference to the aforesaid calculations as the T1 sensor 40 will read the heated air temperature and the calculation will be as indicated above. Heaters can be activated by either discharged air temperature or floor temperature but will not influence the operation other than to require additional or modify the calculations.

The above system may be regarded as a system for positioning damper blades to obtain accurate repeatable amounts of outside air in combination with recirculation or makeup air. The damper systems will have one or more motors to activate the louvres. The motors will preferably act in unison such that when the outside air damper is closing, the inside or return air dampers will be opening.

Conventional control systems rely upon a complex series of velocity sensors to read the relative speed of air in the ventilation system. The above-described apparatus searches for a specific temperature that represents the amount of outside air required. The accuracy of the dampers is not critical in this system as the T3 signal initiates the formation of a signal which controls the damper motors to rotate in one direction or the other seeking more or less outside or ambient air until the desired temperature is obtained. At that point the signal remains constant and the position is held until a new signal is sent. Variations in outside or inside temperature does not influence the setting as the mixed air temperature reflects the new temperatures and provides for the adjustment.

Figure 4A:
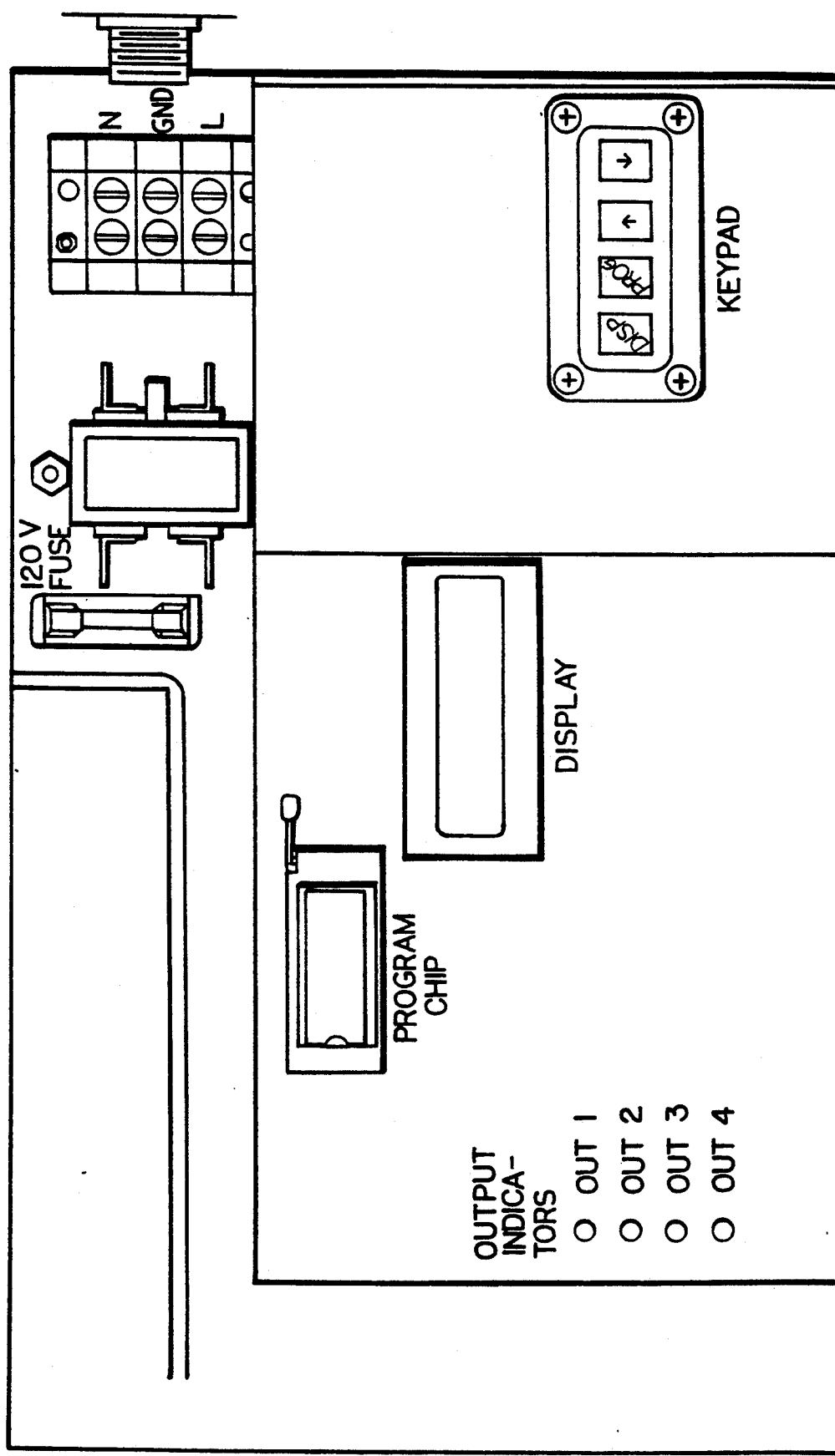
FIGS. 4A and 4B are adjacent sections, abutting along their respective chain lines, of a front view of a panel for a system of the invention.
Figure 4B:
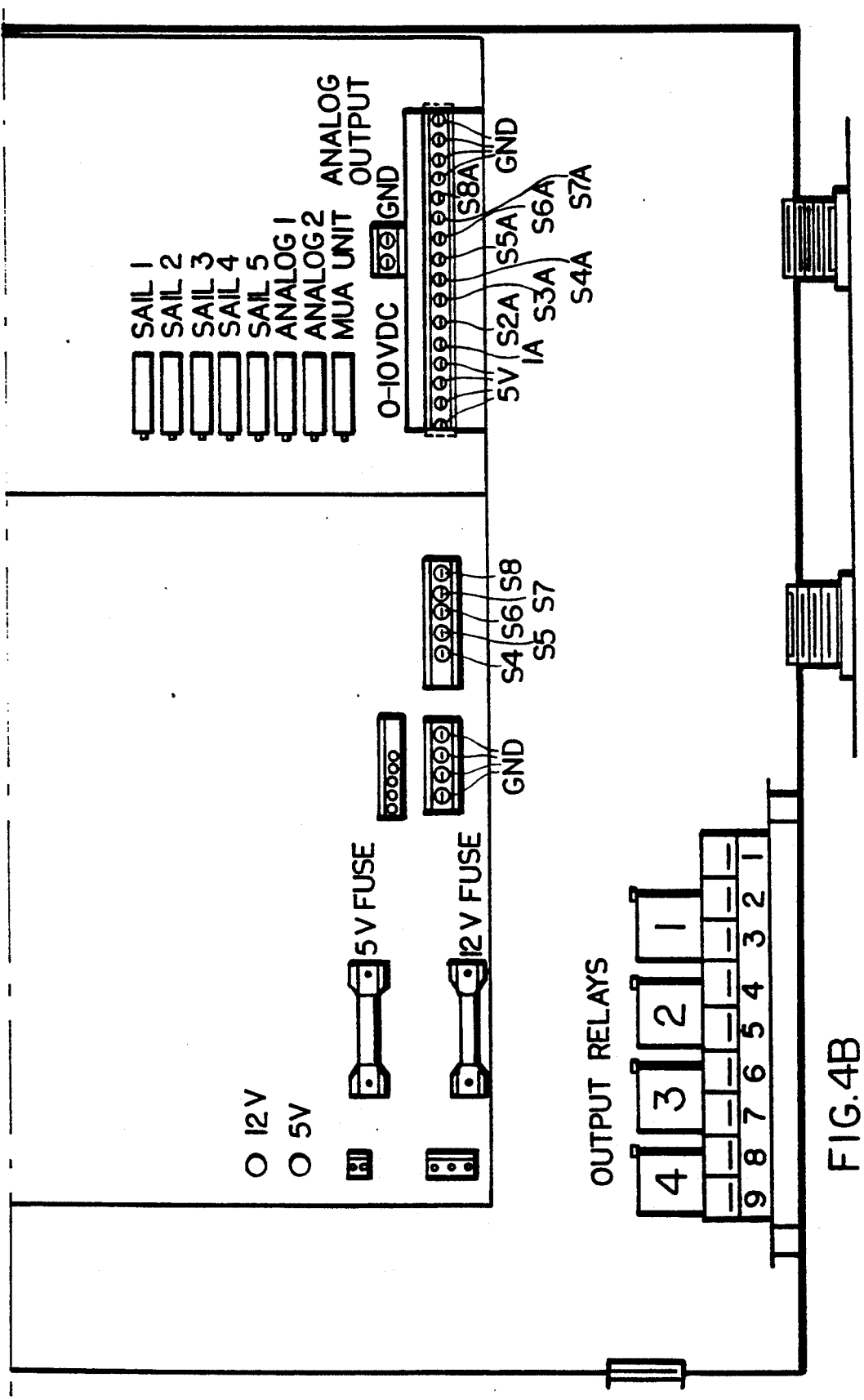
Figure 5:
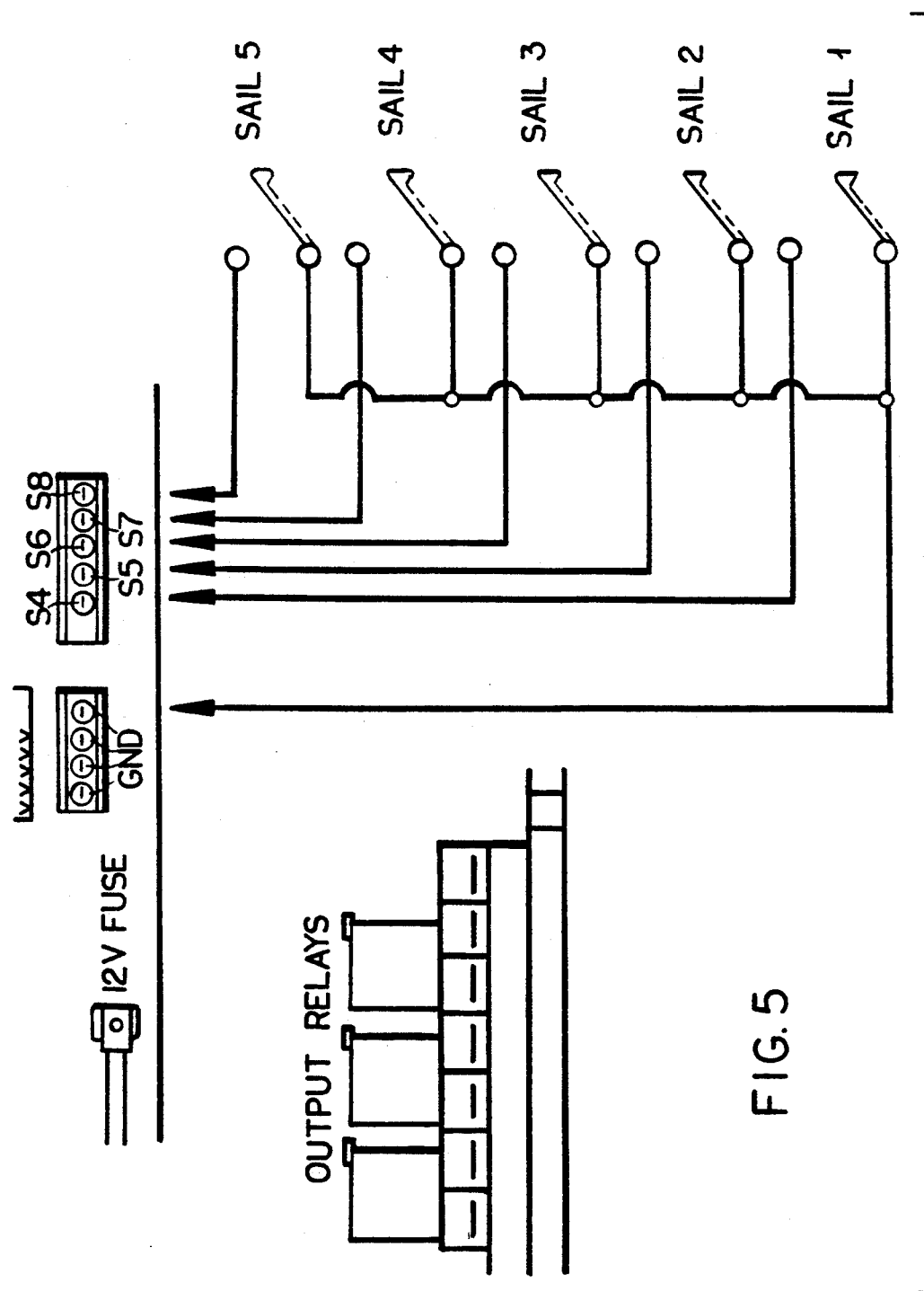
FIGS. 5 and 6 are schematic diagrams showing components associated with the panel of FIG. 4.

The above system can receive additional input signals by employing additional features as follows:

A. A plurality of, for example, five sail switches (see FIGS. 4A 4B and 5). Each switch can register an individual fan or a resistance circuit monitoring many fans.

It is possible to set the quantity of air associated with each exhaust fan, or group, thereby advising the microprocessor how much exhaust is taking place. The micro-processor then selects the appropriate discharge temperature to compensate. A potentiometer can be used to record the cfm of the unit. If the unit is a 50,000 cfm unit, adjustment is made of a screw head until it reads 50 on an LED display. Later on, if it is determined that the system has more or less air, the calibration can be adjusted for that.

A potentiometer can be used to record the cfm of the unit. If the unit is a 50,000 cfm unit, adjustment is made of a screw head until it reads 50 on an LED display. Later on, if it is determined that the system has more or less air, the calibration can be adjusted for that.

Figure 6:
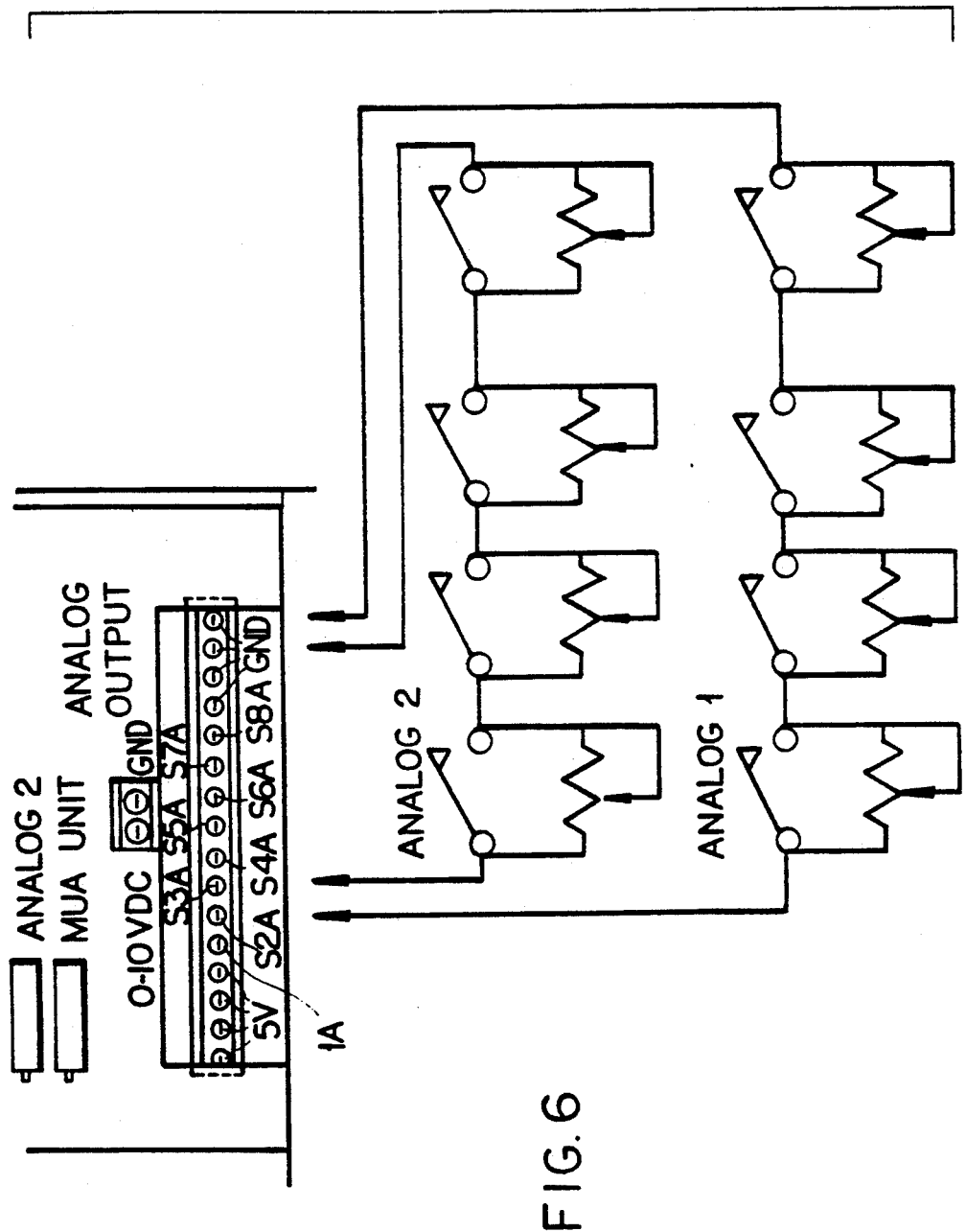

B. Two analog inputs (FIG. 6). These are used to receive signals from external sensors, such as CO, or CO2, monitors, and can control up to four 24 volt relays to start or stop exhaust fans. In a strictly air pollution control situation, it is possible to receive a signal through the analog that an increase of CO is taking place. This signal is registered on a 1 to 100 scale, thereby allowing to start or stop four fans in sequence. Fan one turns on at 25%, fan two at 50%, etc. Each fan has an on-off setting to prevent hunting. When these exhaust fans turn on they send a signal back to the sail switch, which knows its cfm and adjusts the air flow automatically.

Each of the five sail switches has an LED readout and can be calibrated for the exact cfm of the exhaust fan.

If the exhaust capacity of the five exhaust fans exceeds the capacity of the MUA, a fan can be split between two units. For example, a 50,000 cfm fan could be calibrated as two 25,000 cfm fans distributed between two micro-processors.

Advantages of the above include the ability to avoid the problem of damper inaccuracy which is a major factor. Since the calculations always determine the discharge air temperature, and the discharge sensor directs the damper motor to slowly seek the proper temperature, it doesn't matter how accurate the damper is as the right temperature will be found.

The above system will be accurate until the three temperatures monitored are within 3 degrees F. of each other.

With reference to FIGS. 4A, 4B, 5 and 6, and following exemplifies further features of the invention including the following display:

| TWO LINE × 16 CHARACTER LCD DISPLAY | | | | | |
|---|---|---|---|---|---|
| All | S1 | S2 | S3 | S4 | S1–S5 Sail Switches |
| Readings | 10 | 15 | 25 | 0 | A1, A2 Analog Inputs |
| cmf | 0 | 0 | 0 | 50 | Input Valves for cfm × |
| × | S5 | A1 | A2 | MUA | 1000 Adjustable via |
| 1000 | | | | Unit | Potentiometer |

Examples:

If Switch 1 Set: $\frac{10,000}{50,000} = \frac{20\% \text{ Inside Air}}{80\% \text{ Outside Air}}$ -continued

TWO LINE × 16 CHARACTER LCD DISPLAY

If Switch 2 Set:  $\dfrac{15,000}{50,000} = \dfrac{30\% \text{ Inside Air}}{70\% \text{ Outside Air}}$ If Switch 3 Set:  $\dfrac{25,000 \text{ cfm}}{50,000 \text{ cfm}} = \dfrac{50\% \text{ Inside Air}}{50\% \text{ Outside Air}}$ If Switch 1 & 2 Closed, 3 Open:
  20% (SW1) + 30% (SW2) = 50% Outside Air
  (.5 × OA) + (.5 × RA) = Desired DA
If Switches 1, 2, 3 Closed:
  20% (SW1) + 30% (SW2) + 50% = 100% Outside Air
  OA = Desired DA
Switch 2 only:
  30% (SW2)
  (.30 × OA) + (.70 × RA) = Desired DA
After 1 minute delay:
  1. Take temp readings OA, RA, DA.

2. Use these temp readings, sail switches, analog inputs to arrive at desired DA. (Calc. shown previously)

3. $\dfrac{DA - \text{Calc. DA}}{DA} = \pm X$

4. $\dfrac{\text{New Analog Voltage}}{} = \dfrac{\text{Current Analog Voltage} + (\text{Current Analog Voltage})(\pm X)}{1.5}$ 5. Repeat.

There will now be obvious to those skilled in the art many modifications and variations of the systems set forth above. These modifications or variations will not depart from the scope of the invention if defined by the following claims or equivalents thereof.

I claim:

1. Apparatus for a construction having inside and ambient air and including means for controllably exhausting variable amounts of said inside air from within said construction, said apparatus comprising a system including first air guiding means defining a principle flow path for air, second air guiding means for admitting said ambient air into said principle flow path, first control means for controlling the rate of flow of said ambient air into said principle flow path, means for admitting said inside air into said principle flow path, second control means for controlling the rate of flow of said inside air into said principle flow path, discharge means for enabling the discharge of air from said principle flow into the interior of said construction at a predetermined rate, sensing means to measure the temperatures of said inside and ambient and discharged air, processing means responsive to the amount of air being exhausted from within said construction and to said sensing means to generate signals to control said first and second control means to adjust the rates of flow of said inside and ambient air to make up for the amount of air being exhausted from within the construction.

2. Apparatus as claimed in claim 1, wherein said control means include dampers and motors to control said dampers, said motors being coupled to and responsive to said processing means to be controlled by said signals.

3. Apparatus as claimed in claim 2, wherein said discharge means includes a fan operating with a constant throughout.

4. Apparatus as claimed in claim 3, wherein said principle flow path is at least substantially vertical and said discharge means includes at least one discharge vent discharging air in a horizontal direction.

5. Apparatus as claimed in claim 4, wherein said discharge means includes a plurality of discharge vents discharging air in a multiple of horizontal directions which are radially disposed relative to said principle flow path.

6. Apparatus as claimed in claim 4, wherein said construction includes a roof and said apparatus further includes means supporting said first and second air guiding means on said roof, said second air guiding means providing for the flow of ambient air through the roof into the principle flow path.

7. Apparatus as claimed in claim 3, wherein said processing means functions to operate the motors in unison such that said motors operate in opposite manner to open and close the associated dampers respectively.

8. Apparatus as claimed in claim 7, wherein said processing means is adapted to determine a control temperature related to the make up air required and controls the motors to adjust the dampers until said control temperature is detected by the sensing means which measures the temperature of the discharged air.

9. Apparatus as claimed in claim 3, comprising at least one additional system corresponding to the first said system but having a constant rate of air discharge different from that of the first said system.

10. A method for controlling the flow of air in a structure having controllable rates for venting air from within the structure and having inside and ambient air flows, said method comprising the steps of mixing controlled flows of said inside and ambient air flows to obtain a mixture there of to replenish the air vented from the structure, calculating a temperature for the mixture based on the respective temperatures of the inside and ambient air flows and on the rate of venting air from the structure, controlling the rates of flow of the inside and ambient air flows in accordance with the calculated temperature, and discharging said mixture within said structure to make up for the vented air.

11. A method as claimed in claim 10, wherein the rate of said discharging is effected independently of the temperature of the inside and ambient air.

* * * * *